United States Patent
Li et al.

(10) Patent No.: US 11,489,296 B2
(45) Date of Patent: Nov. 1, 2022

(54) POWER SUPPLY

(71) Applicant: CHICONY POWER TECHNOLOGY CO., LTD., New Taipei (TW)

(72) Inventors: Hsieh-Ting Li, New Taipei (TW); Yen-Chih Chen, New Taipei (TW); Po-Sheng Lee, New Taipei (TW)

(73) Assignee: CHICONY POWER TECHNOLOGY CO., LTD., New Taipei (TW)

( * ) Notice: Subject to any disclaimer, the term of this patent is extended or adjusted under 35 U.S.C. 154(b) by 353 days.

(21) Appl. No.: 16/921,252

(22) Filed: Jul. 6, 2020

(65) Prior Publication Data

US 2021/0336392 A1 Oct. 28, 2021

(30) Foreign Application Priority Data

Apr. 23, 2020 (TW) .................. 109113656

(51) Int. Cl.
*H01R 11/22* (2006.01)
*H01R 13/66* (2006.01)
(Continued)

(52) U.S. Cl.
CPC ....... *H01R 13/6675* (2013.01); *H01R 13/508* (2013.01); *H01R 13/6658* (2013.01); *H01R 24/68* (2013.01); *H01R 31/065* (2013.01)

(58) Field of Classification Search
CPC ... H01R 13/111; H01R 13/115; H01R 13/187; H01R 3/34; H01R 27/00
See application file for complete search history.

(56) References Cited

U.S. PATENT DOCUMENTS 7,179,105 B1    2/2007   Hung
7,212,420 B2 *   5/2007   Liao .................. H01R 13/6675
                                                                           363/146
(Continued)

FOREIGN PATENT DOCUMENTS

CN      204721232 U    10/2015
CN      205335462 U     6/2016
(Continued)

OTHER PUBLICATIONS

Office Action (with a Search Report attached) issued in corresponding TW application 109113656 dated Mar. 5, 2021 (3 pages).

*Primary Examiner* — Phuong Chi Thi Nguyen
(74) *Attorney, Agent, or Firm* — Muncy, Geissler, Olds & Lowe, P.C.

(57) ABSTRACT

A power supply includes a cover body, a metal plate, a metal clip, a circuit board and a housing. The metal plate is partially disposed in a first space of the cover body. The metal clip is disposed in the first space and electrically connected to the metal plate, and includes an upper spring piece, a lower spring piece and a connecting piece. The connecting piece has a fixing portion corresponding to a gap between the upper and lower spring pieces. The circuit board includes an input portion and an output portion. The input portion is disposed in the gap, and has a protruding part for engaging with the fixing portion. The housing includes an output interface and an opening communicating with an accommodating space of the housing. The cover body is connected to the opening. The output interface is electrically connected to the output portion.

10 Claims, 8 Drawing Sheets

(51) Int. Cl.
*H01R 31/06* (2006.01)
*H01R 13/508* (2006.01)
*H01R 24/68* (2011.01)

(56) References Cited

U.S. PATENT DOCUMENTS

| | | | | |
|---|---|---|---|---|
| 7,946,884 | B2* | 5/2011 | Chiang | H01R 27/00 |
| | | | | 439/518 |
| 8,087,946 | B2* | 1/2012 | Namiki | H01R 13/639 |
| | | | | 439/173 |
| 8,465,307 | B2* | 6/2013 | Shieh | H01R 31/06 |
| | | | | 439/173 |
| 8,801,465 | B2* | 8/2014 | Yeh | H01R 24/66 |
| | | | | 439/76.1 |
| 9,184,518 | B2 | 11/2015 | Ivey et al. | |
| 9,236,699 | B2 | 1/2016 | Lai | |
| 2004/0110397 | A1 | 6/2004 | Chen | |
| 2017/0290183 | A1 | 10/2017 | Lee et al. | |
| 2021/0219436 | A1* | 7/2021 | Lin | H05K 5/0247 |
| 2021/0336392 | A1* | 10/2021 | Li | H01R 13/6658 |

FOREIGN PATENT DOCUMENTS

| | | |
|---|---|---|
| CN | 106785654 A | 5/2017 |
| CN | 206585476 U | 10/2017 |
| CN | 207994283 U | 10/2018 |
| TW | I255085 B | 5/2006 |
| TW | M389966 U | 10/2010 |
| TW | M482902 U | 7/2014 |
| TW | M499689 U | 4/2015 |
| TW | 201643347 A | 12/2016 |
| TW | I621383 B | 4/2018 |
| TW | I637569 B | 10/2018 |

\* cited by examiner

POWER SUPPLY

CROSS REFERENCE TO RELATED APPLICATIONS

This Non-provisional application claims priority under 35 U.S.C. § 119(a) on Patent Application No(s). 109113656 filed in Taiwan, Republic of China on Apr. 23, 2020, the entire contents of which are hereby incorporated by reference.

BACKGROUND

Technology Field

This disclosure relates to a power supply and, in particular, to a power supply capable of firmly fixing the circuit board therein.

Description of Related Art

Conventionally, in the combination process of the metal clip and the circuit board of the power supply, the metal clip is deformed by the interference of the circuit board so as to generate the clamping force to hold the circuit board, thereby achieving the combination and electrical connection between the metal clip and the circuit board. However, if the power supply is violently shaken, the clamping force alone is not enough to fix the circuit board with the metal clip. Accordingly, the metal clip and the circuit board may be misaligned or detached, which may result in the bad connection problem.

Therefore, it is desired to provide a power supply that can enhance the fixing force between the circuit board and the metal clip so as to prevent the misalignment or detachment of the metal clip and the circuit board caused by shaking, thereby avoiding the bad connection problem.

SUMMARY

An objective of this disclosure is to provide a power supply. Compared with the conventional art, the design of the connection structure between the metal clip and the circuit board of the power supply of this disclosure can achieve the effects of positioning, limiting and fixing the circuit board so as to prevent the misalignment or detachment of the metal clip and the circuit board caused by shaking, thereby avoiding the bad connection problem.

To achieve the above, this disclosure provides a power supply, which comprises a cover body, at least a metal plate, at least a metal clip, a circuit board and a housing. The cover body comprises a top cover and a sidewall portion surrounding the top cover, and the top cover and the sidewall portion define a first space. A first end of the metal plate is disposed in the first space, and a second end of the metal plate opposite to the first end of the metal plate passes through the top cover and extends outwardly. The metal clip is disposed in the first space and electrically connected to the first end of the metal plate. The metal clip comprises an upper spring piece, a lower spring piece and a connecting piece. The upper spring piece and the lower spring piece are connected to the connecting piece, respectively. A gap is configured between the upper spring piece and the lower spring piece, and the connecting piece has a fixing portion corresponding to the gap. The circuit board comprises an input portion and an output portion. The input portion is correspondingly disposed in the gap and electrically connected to the upper spring piece and the lower spring piece. A front end of the input portion is configured with a protruding part for engaging with the fixing portion. The housing comprises an opening and an output interface. The opening communicates with an accommodating space inside the housing. The sidewall portion is connected to the opening for fixing the circuit board in the accommodating space. The output interface is electrically connected to the output portion.

In one embodiment, the first space comprises a limiting portion, and the upper spring piece and the lower spring piece are disposed in the limiting portion.

In one embodiment, the upper spring piece and the lower spring piece are symmetrically arranged with respect to the long sides thereof and disposed on the connecting piece, and the upper spring piece and the lower spring piece clamp the circuit board in a deformation way.

In one embodiment, the sidewall portion further comprises a groove portion disposed toward the first space, the circuit board further comprises an extension portion, and the extension portion is engaged with the groove portion.

In one embodiment, the sidewall portion further comprises a rib portion disposed toward the first space, the circuit board further comprises a recess portion, and the rib portion is engaged with the recess portion.

In one embodiment, the fixing portion is a square opening, and the protruding part is engaged with the square opening.

In one embodiment, the metal clip further comprises two protruding blocks disposed close to the square opening, and the protruding part is engaged with the square opening and contacting against the protruding blocks.

In one embodiment, the circuit board further comprises two slots disposed close to the protruding part, and the protruding blocks are further engaged with the slots.

In one embodiment, the power supply comprises two metal plates and two metal clips, and the first ends of the metal plates are electrically connected to the metal clips, respectively.

In one embodiment, each of the metal clips comprises a hollow portion, and the first ends of the metal plates couple to the hollow portions of the metal clips, respectively.

As mentioned above, the design of the connection structure between the metal clip and the circuit board of the power supply of this disclosure can achieve the effects of positioning, limiting and fixing the circuit board so as to prevent the misalignment or detachment of the metal clip and the circuit board caused by shaking, thereby avoiding the bad connection problem.

BRIEF DESCRIPTION OF THE DRAWINGS

The disclosure will become more fully understood from the detailed description and accompanying drawings, which are given for illustration only, and thus are not limitative of the present disclosure, and wherein.

DETAILED DESCRIPTION OF THE DISCLOSURE

The present disclosure will be apparent from the following detailed description, which proceeds with reference to the accompanying drawings, wherein the same references relate to the same elements.

The design of the connection structure between the metal clip and the circuit board of the power supply of this disclosure can achieve the effects of positioning, limiting and fixing the circuit board so as to prevent the misalignment or detachment of the metal clip and the circuit board caused by shaking, thereby avoiding the bad connection problem.

Figure 1:
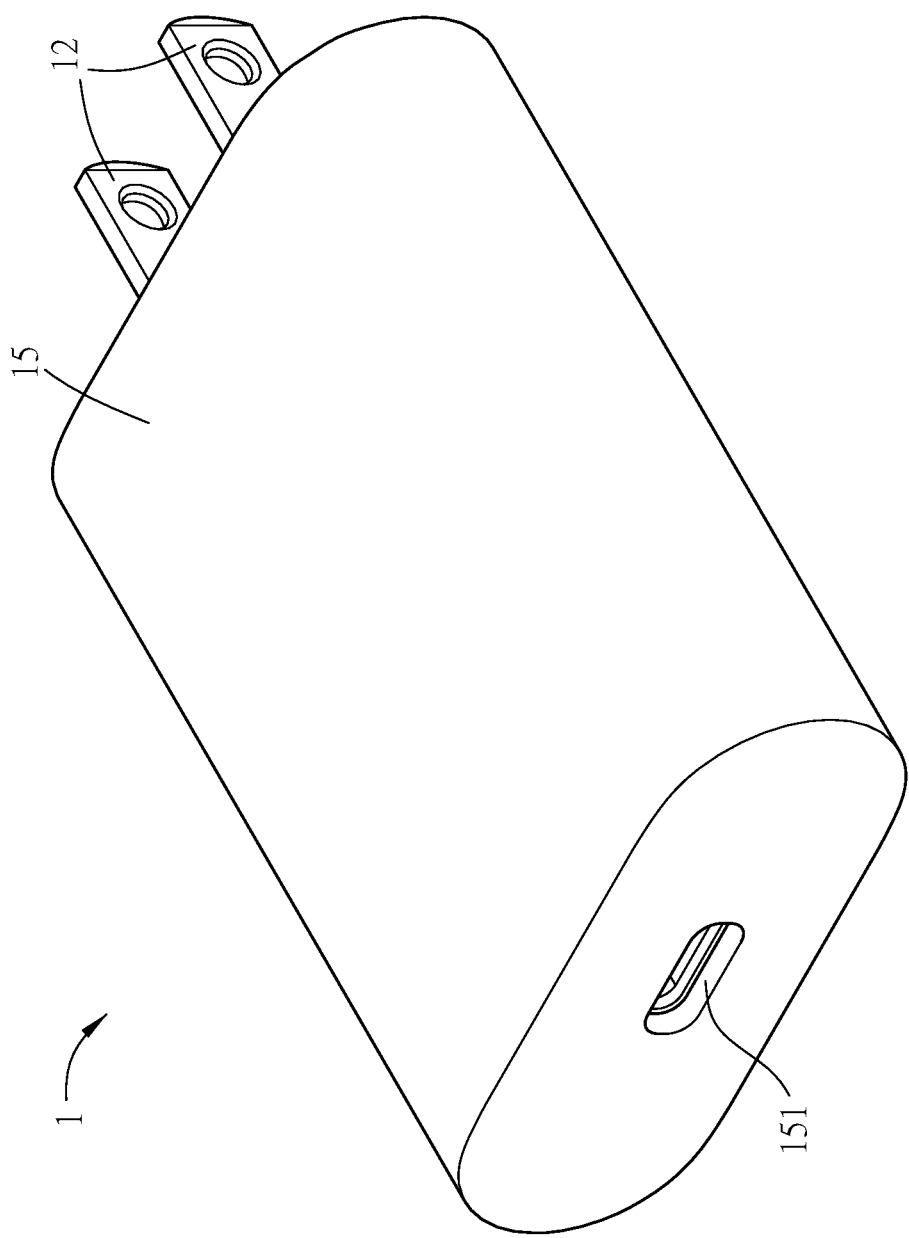
FIG. 1 is a schematic diagram of a power supply of this disclosure.
Figure 2A:
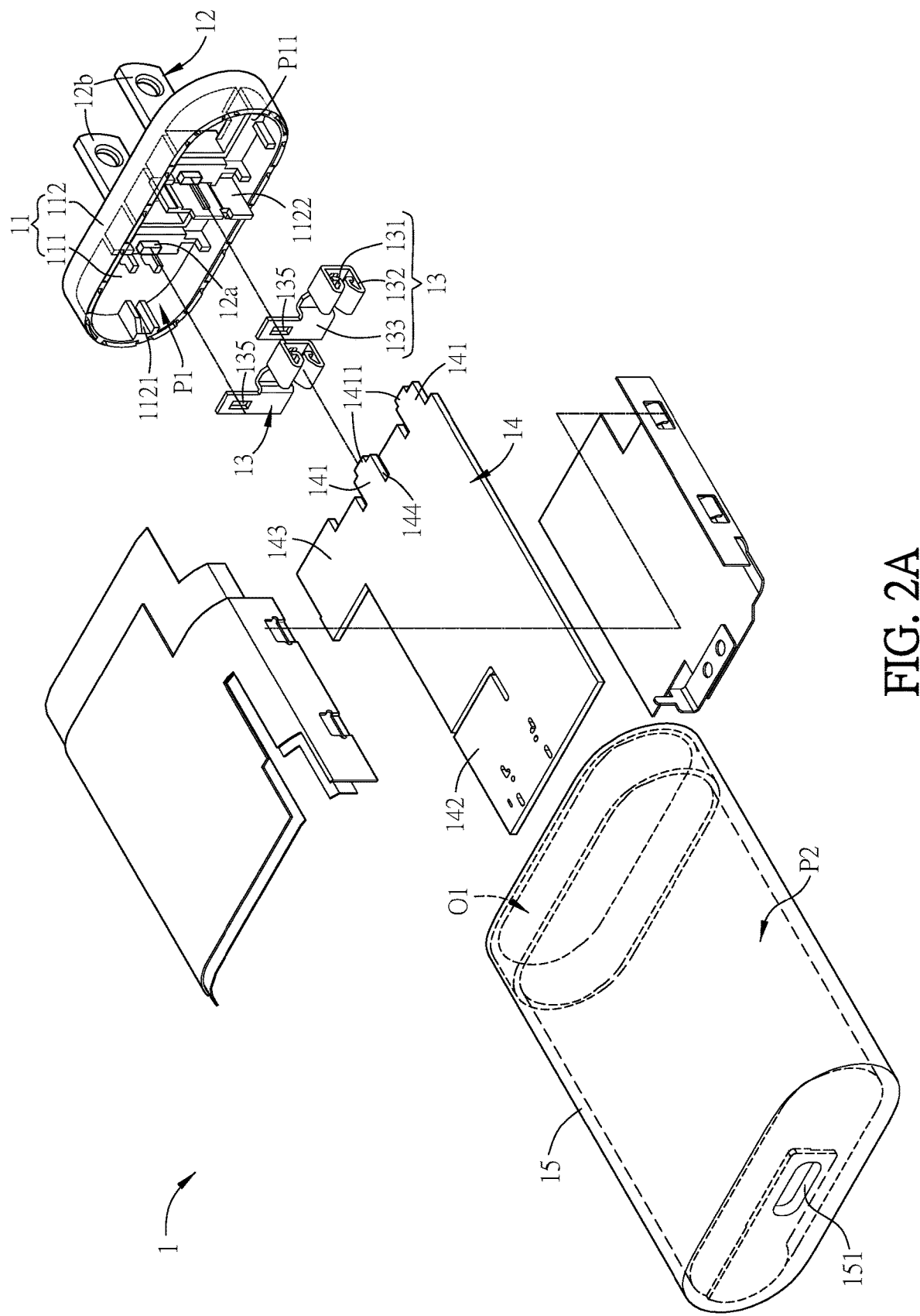
FIG. 2A is an exploded view of the power supply of FIG. 1.

FIG. 1 is a schematic diagram of a power supply 1 of this disclosure, and FIG. 2A is an exploded view of the power supply 1 of FIG. 1. Referring to FIGS. 1 and 2A, the power supply 1 comprises a cover body 11, at least one metal plate 12, at least one metal clip 13, a circuit board 14, and a housing 15. The cover body 11 comprises a top cover 111 and a sidewall portion 112 surrounding the top cover 111, and the top cover 111 and the sidewall portion 112 define a first space P1. A first end 12a of the metal plate 12 is disposed in the first space P1, and a second end 12b of the metal plate 12 opposite to the first end 12a passes through the top cover 111 and extends outwardly. In this embodiment, the second end 12b of the metal plate 12 is configured to electrically connect with the power system, such as the utility power.

Figure 3A:
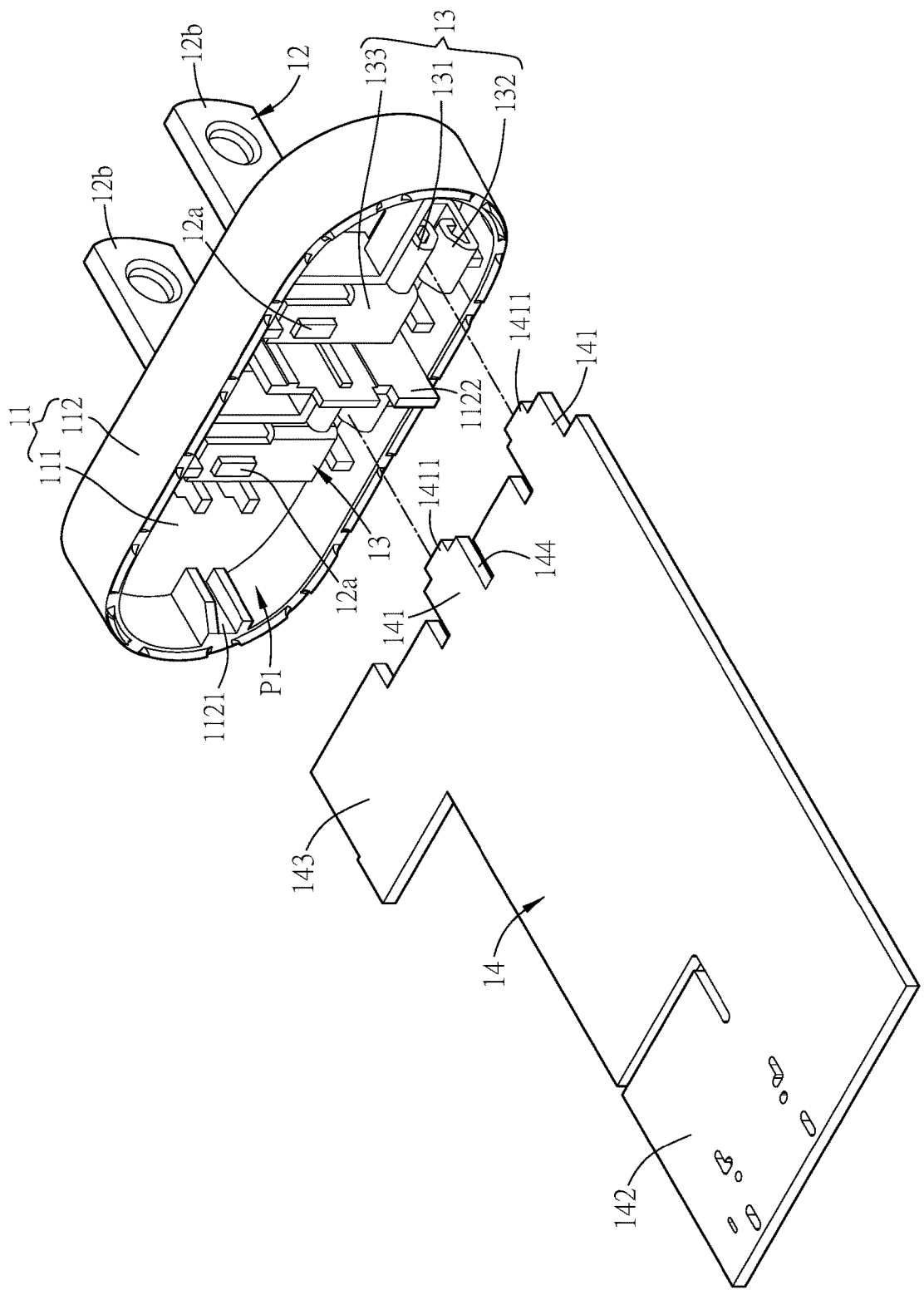
FIGS. 3A and 3B are schematic diagrams showing the assembling process of the cover body, the metal plate, the metal clip and the circuit board as shown in FIG. 2A, wherein the cover body, the metal plate and the metal clip are assembled in advance, and only the assembling process of the metal clip and the circuit board is shown.
Figure 3B:
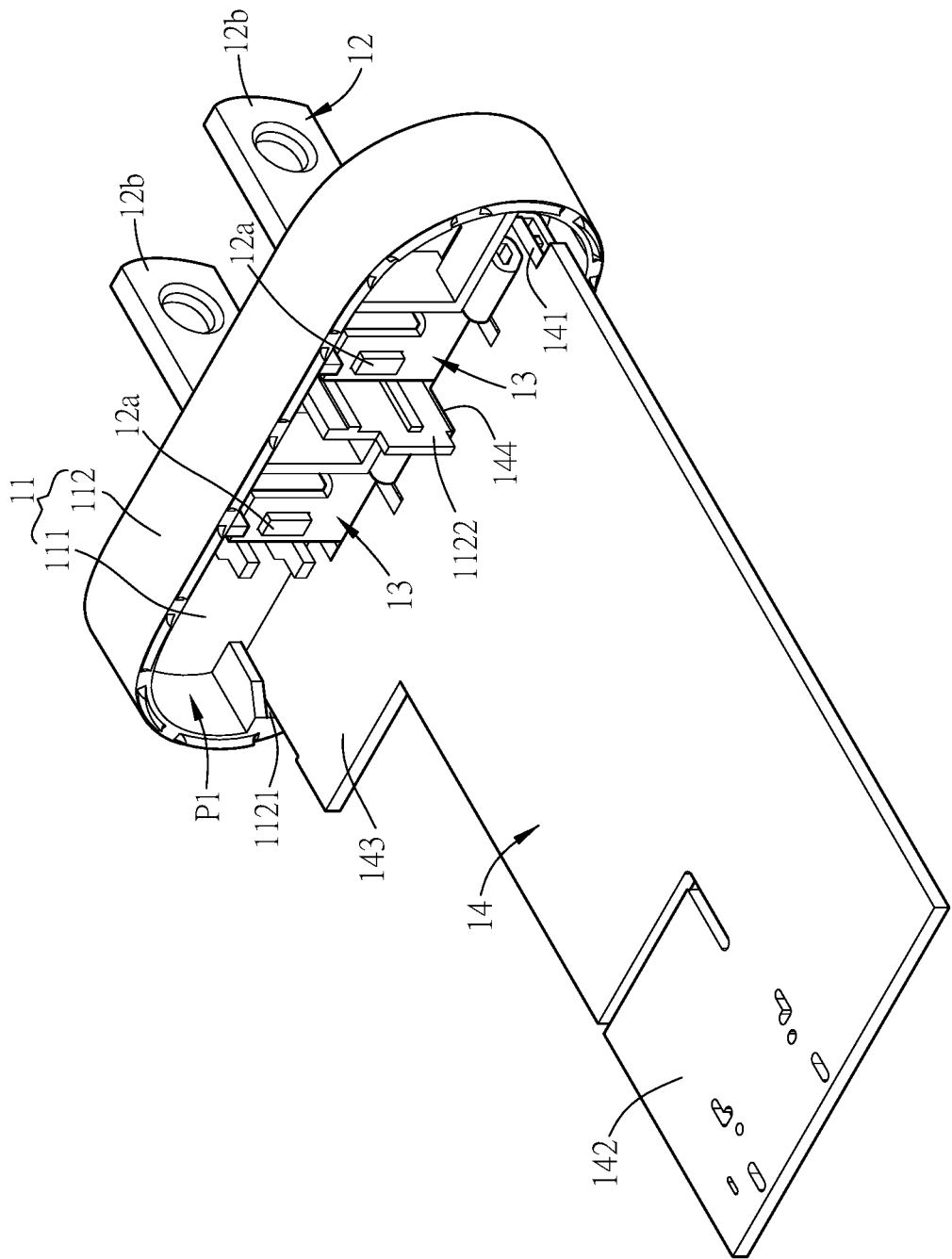
Figure 4:
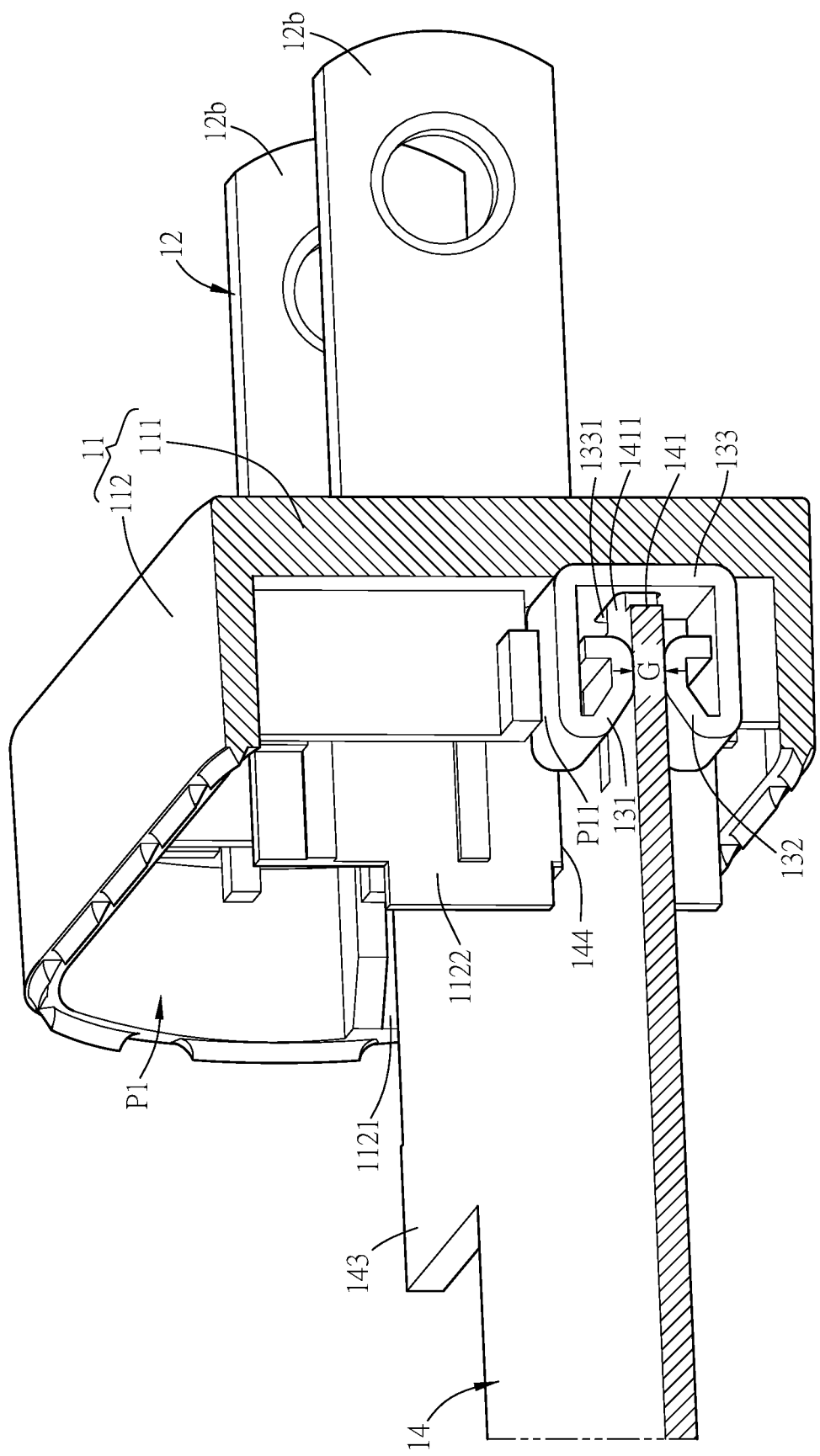
FIG. 4 is a sectional view of the power supply of FIG. 3B.
Figure 5A:
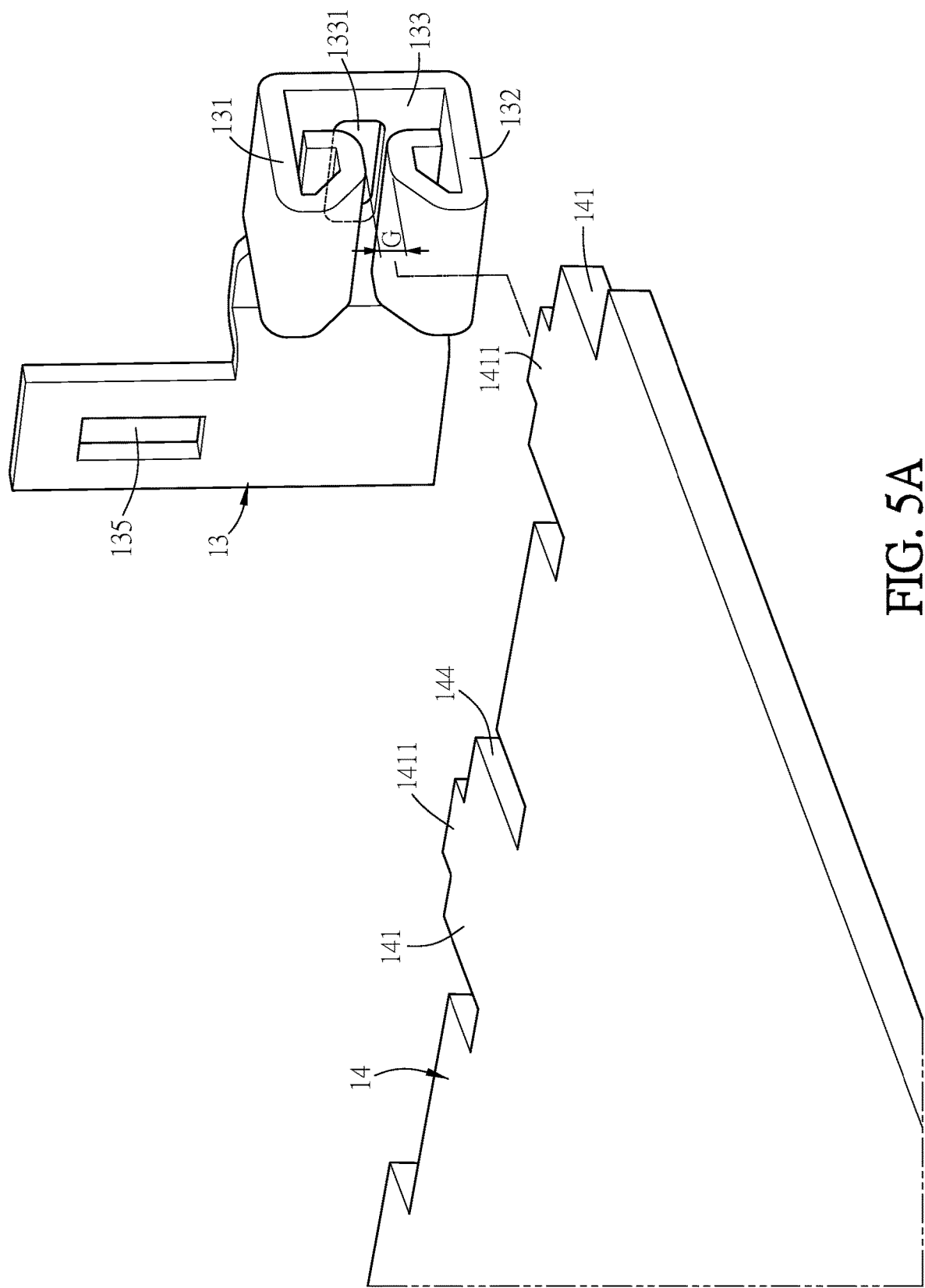
FIGS. 5A and 5B are schematic diagrams showing the metal clip and the circuit board as depicted in FIG. 3A according to different embodiments.
Figure 5B:
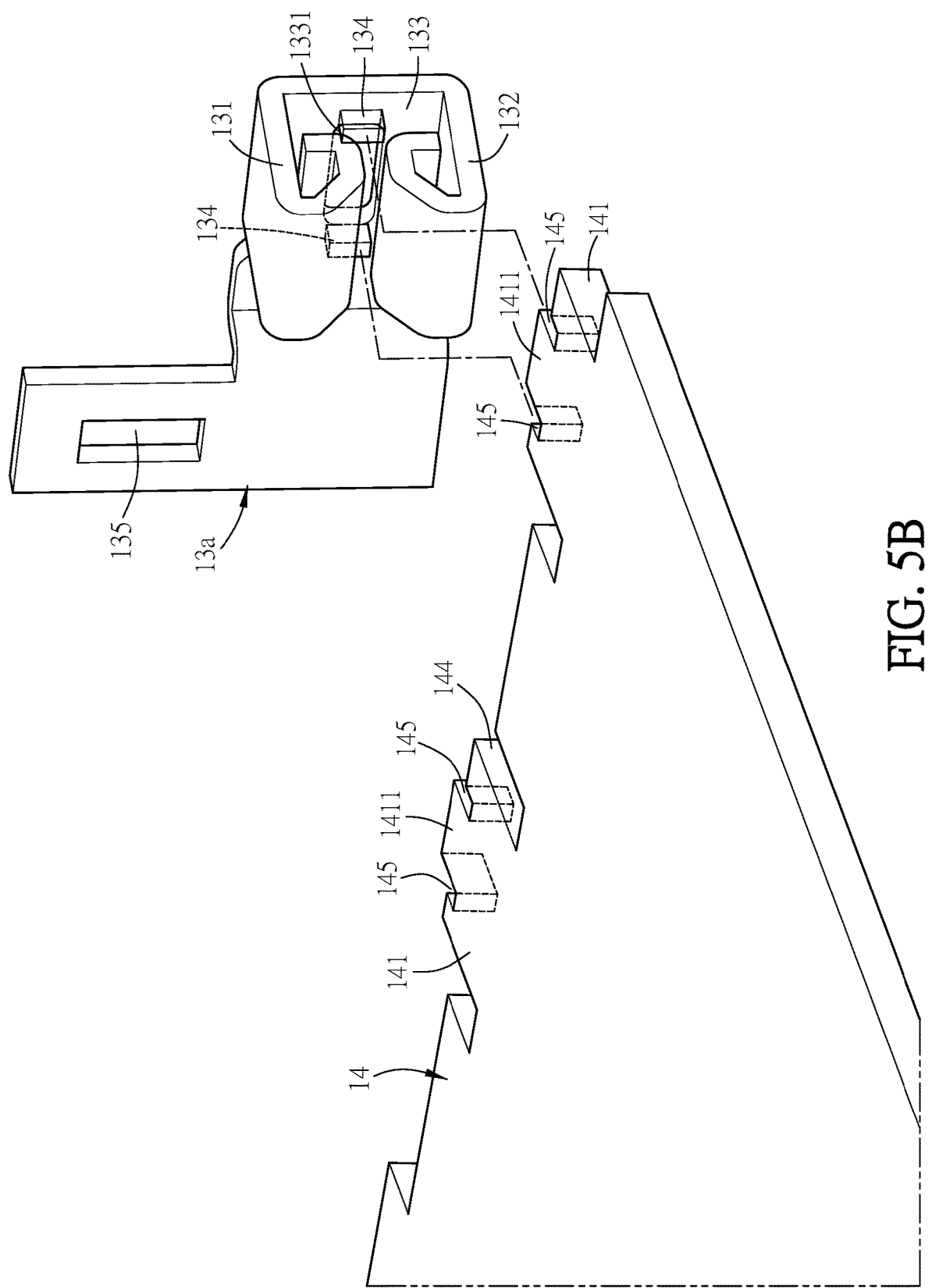

FIGS. 3A and 3B are schematic diagrams showing the assembling process of the cover body, the metal plate, the metal clip and the circuit board as shown in FIG. 2A, wherein the cover body, the metal plate and the metal clip are assembled in advance, and only the assembling process of the metal clip and the circuit board is shown. FIG. 4 is a sectional view of the power supply of FIG. 3B, and FIGS. 5A and 5B are schematic diagrams showing the metal clip and the circuit board as depicted in FIG. 3A according to different embodiments. Referring to FIGS. 2A, 3A, 4 and 5A, in this embodiment, the metal clip 13 is disposed in the first space P1 and electrically connected to the first end 12a of the metal plate 12. The metal clip 13 comprises an upper spring piece 131, a lower spring piece 132, and a connecting piece 133. The upper spring piece 131 and the lower spring piece 132 are connected to the connecting piece 133, respectively. A gap G is configured between the upper spring piece 131 and the lower spring piece 132, and the connecting piece 133 has a fixing portion 1331 corresponding to the gap G In detailed, the upper spring piece 131 and the lower spring piece 132 are symmetrically arranged with respect to the long sides thereof and are disposed on the connecting piece 133.

In this embodiment, the circuit board 14 comprises an input portion 141 and an output portion 142. The input portion 141 is correspondingly disposed in the gap G and electrically connected to the upper spring piece 131 and the lower spring piece 132. A front end of the input portion 141 is configured with a protruding part 1411, which is configured to engage with the fixing portion 1331. In detailed, the protruding part 1411 of the input portion 141 can move about in the gap G between the upper spring piece 131 and the lower spring piece 132 and then be inserted into the fixing portion 1331. Afterward, the upper spring piece 131 and the lower spring piece 132 can clamp the circuit board 14 in a deformation way, and the protruding part 1411 and the fixing portion 1331 can engage with each other for fixing the circuit board 14. In this case, the upper spring piece 131, the lower spring piece 132, the gap G and the fixing portion 1331 can help to guide the protruding part 1411 into the fixing portion 1331, so that the structure of this disclosure can provide the effects of positioning, limiting and fixing the circuit board 14.

With reference to FIG. 2A, in this embodiment, the housing 15 comprises an opening O1 and an output interface 151. The opening O1 communicates with an accommodating space P2 inside the housing 15. The sidewall portion 112 is connected to the opening O1 for fixing the circuit board 14 in the accommodating space P2. The output interface 151 is electrically connected to the output portion 142. For example, the output interface 151 can further connect to, for example but not limited to, the USB connector or any of other connectors for providing the power to another electronic device. In particular, the opening O1 and the accommodating space P2 cannot be observed from the viewing angle of FIG. 2A, so the opening O1 and the accommodating space P2 are shown by dotted lines in FIG. 2A.

Figure 2B:
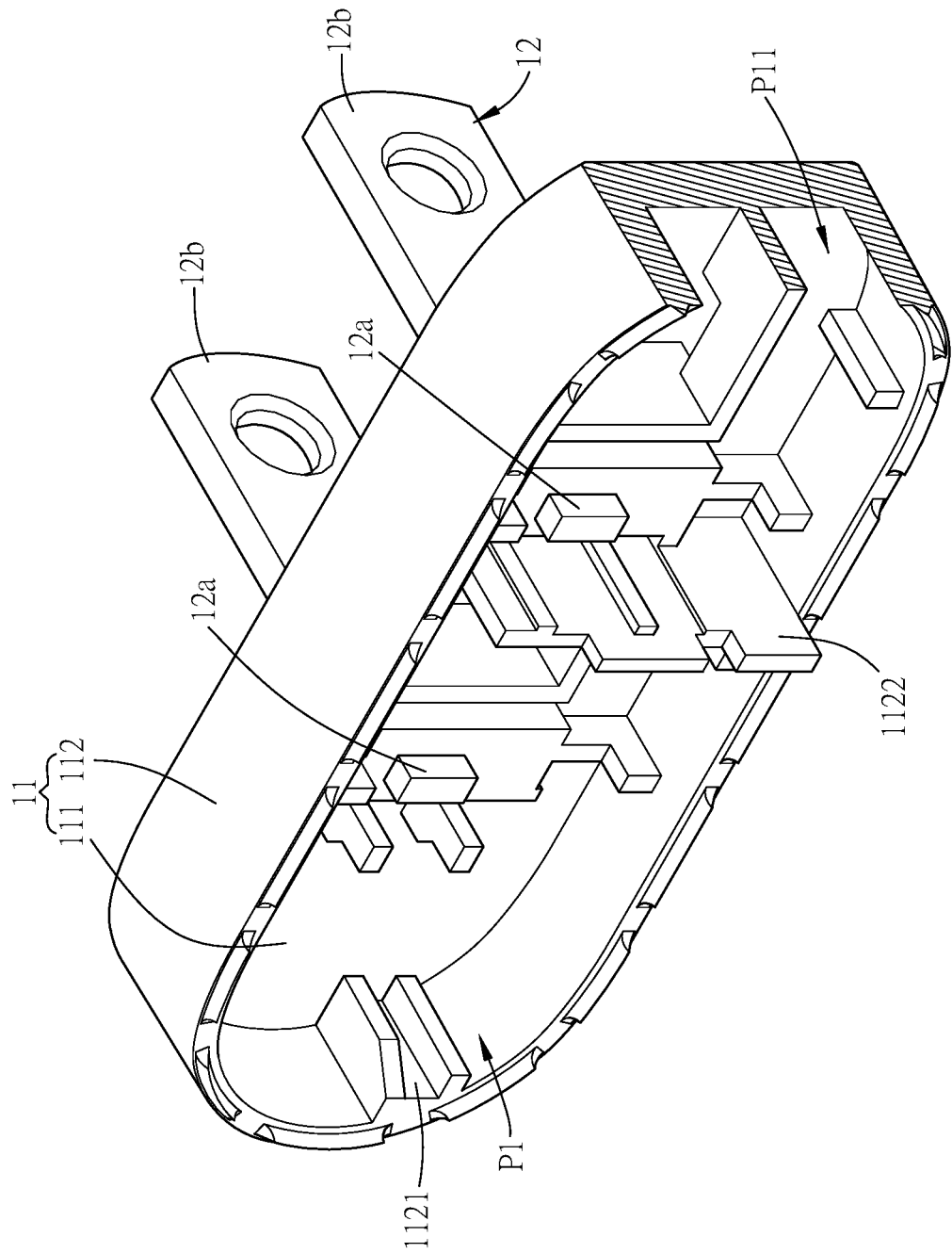
FIG. 2B is a sectional view of the cover body of the power supply of FIG. 2A.

FIG. 2B is a sectional view of the cover body of the power supply of FIG. 2A. Referring to FIGS. 2A, 2B and 4, in this embodiment, the first space P1 comprises a limiting portion P11, and the upper spring piece 131 and the lower spring piece 132 are disposed in the limiting portion P11. In this structure, the limiting portion P11 can firmly fix the metal clip 13 in the first space P1. In particular, the internal structure of the cover body 11 are not obvious from the viewing angle of FIG. 2A, so FIG. 2A includes some dotted lines to assist the observation of the internal space of the cover body 11.

As shown in FIGS. 2A to 3B, in this embodiment, the sidewall portion 112 further comprises a groove portion 1121 disposed toward the first space P1, and the circuit board 14 further comprises an extension portion 143. The extension portion 143 is engaged with the groove portion 1121. In this embodiment, the configuration of the groove portion 1121 can enhance the fixing force between the cover body 11 and the circuit board 14.

In this embodiment, the sidewall portion 112 further comprises a rib portion 1122 disposed toward the first space P1, and the circuit board 14 further comprises a recess portion 144. The rib portion 1122 is engaged with the recess portion 144. In this embodiment, the configuration of the rib portion 1122 can enhance the fixing force between the cover body 11 and the circuit board 14 and separate two metal clips 13. After the two input portions 141 of the circuit board 14 are electrically connected to the metal clips 13, respectively, the rib portion 1122 can prevent the metal clips 13 from contacting so as to avoid the short-circuit problem.

Referring to FIGS. 4 and 5A, in this embodiment, the fixing portion 1331 is a square opening, and the protruding part 1411 is engaged with the square opening. To be noted, in addition to the square opening, the fixing portion 1331 can also be a circular opening, an elliptic opening, a triangular opening, a rectangular opening, or a polygonal opening, and this disclosure is not limited. The protruding part 1411 can be designed as any shape corresponding to the fixing portion 1331, so that the protruding part 1411 can be inserted into the fixing portion 1331. The structural design of the fixing portion 1331 and the protruding part 1411 can provide a more firmly connection between the metal board 14 and the metal clip 13, thereby preventing the detachment of the metal clip 13 and the circuit board 14 caused by shaking.

Referring to FIGS. 2A to 3B, in this embodiment, the power supply 1 comprises two metal plates 12 and two metal clips 13, and the first ends 12a of the metal plates 12 are electrically connected to the metal clips 13, respectively. In detailed, each metal clip 13 comprises a hollow portion 135, and the first ends 12a of the metal plates 12 couple to the hollow portions 135 of the metal clips 13, respectively. For example, the two metal plates 12 can insert into, for example but not limited to, a socket for electrically connecting to the utility power. The shapes of the hollow portions 135 and the first ends 12a of the metal plates 12 can be modified based on the requirement of the user. In practice, the shapes can be, for example but not limited to, circular, elliptic, triangular, rectangular, or polygonal, provided that the hollow portions 135 and the first ends 12a can connect and fix together, and this disclosure is not limited.

FIG. 5B is a schematic diagram showing connection structure of the metal clip and the circuit board according to another embodiment. Referring to FIGS. 4 and 5B, the metal clip 13a further comprises two protruding blocks 134 disposed close to the square opening, and the protruding part 1411 is engaged with the square opening and contacting against the protruding blocks 134. In another embodiment, the circuit board 14 further comprises two slots 145 disposed close to the protruding part 1411. The protruding part 1411 is engaged with the square opening and contacting against the protruding blocks 134, and the protruding blocks 134 are further engaged with the slots 145. The configuration of the protruding blocks 134 and the slots 145 can increase the fixing force between the metal clip 13a and the circuit board 14 so as to prevent the misalignment or detachment of the metal clip 13a and the circuit board 14 caused by shaking. In particular, the protruding blocks 134 are disposed at two sides of the long axis of the fixing portion 1331 in this embodiment. However, the positions and amount of the protruding blocks 134 can be adjusted based on the requirement of the user, only if the circuit board 14 is configured with the slots 145 corresponding to the protruding blocks 134. This disclosure is not limited.

In summary, the design of the connection structure between the metal clip and the circuit board of the power supply of this disclosure can achieve the effects of positioning, limiting and fixing the circuit board so as to prevent the misalignment or detachment of the metal clip and the circuit board caused by shaking, thereby avoiding the bad connection problem.

Although the disclosure has been described with reference to specific embodiments, this description is not meant to be construed in a limiting sense. Various modifications of the disclosed embodiments, as well as alternative embodiments, will be apparent to persons skilled in the art. It is, therefore, contemplated that the appended claims will cover all modifications that fall within the true scope of the disclosure.

What is claimed is:

1. A power supply, comprising:
   a cover body comprising a top cover and a sidewall portion surrounding the top cover, wherein the top cover and the sidewall portion define a first space;
   at least a metal plate, wherein a first end of the metal plate is disposed in the first space, and a second end of the metal plate opposite to the first end of the metal plate passes through the top cover and extends outwardly;
   at least a metal clip disposed in the first space and electrically connected to the first end of the metal plate, wherein the metal clip comprises an upper spring piece, a lower spring piece and a connecting piece, the upper spring piece and the lower spring piece are connected to the connecting piece, respectively, a gap is configured between the upper spring piece and the lower spring piece, and the connecting piece has a fixing portion corresponding to the gap;
   a circuit board comprising an input portion and an output portion, wherein the input portion is correspondingly disposed in the gap and electrically connected to the upper spring piece and the lower spring piece, and a front end of the input portion is configured with a protruding part for engaging with the fixing portion; and
   a housing comprising an opening and an output interface, wherein the opening communicates with an accommodating space inside the housing, the sidewall portion is connected to the opening for fixing the circuit board in the accommodating space, and the output interface is electrically connected to the output portion.

2. The power supply of claim 1, wherein the first space comprises a limiting portion, and the upper spring piece and the lower spring piece are disposed in the limiting portion.

3. The power supply of claim 1, wherein the upper spring piece and the lower spring piece are symmetrically arranged with respect to long sides thereof and disposed on the connecting piece, and the upper spring piece and the lower spring piece clamp the circuit board in a deformation way.

4. The power supply of claim 1, wherein the sidewall portion further comprises a groove portion disposed toward the first space, the circuit board further comprises an extension portion, and the extension portion is engaged with the groove portion.

5. The power supply of claim 1, wherein the sidewall portion further comprises a rib portion disposed toward the first space, the circuit board further comprises a recess portion, and the rib portion is engaged with the recess portion.

6. The power supply of claim 1, comprising two metal plates and two metal clips, wherein the first ends of the metal plates are electrically connected to the metal clips, respectively.

7. The power supply of claim 6, wherein each of the metal clips comprises a hollow portion, and the first ends of the metal plates couple to the hollow portions of the metal clips, respectively.

8. The power supply of claim 1, wherein the fixing portion is a square opening, and the protruding part is engaged with the square opening.

9. The power supply of claim 8, wherein the metal clip further comprises two protruding blocks disposed close to the square opening, and the protruding part is engaged with the square opening and contacting against the protruding blocks.

10. The power supply of claim 9, wherein the circuit board further comprises two slots disposed close to the protruding part, and the protruding blocks are further engaged with the slots.

* * * * *